Figure 1:
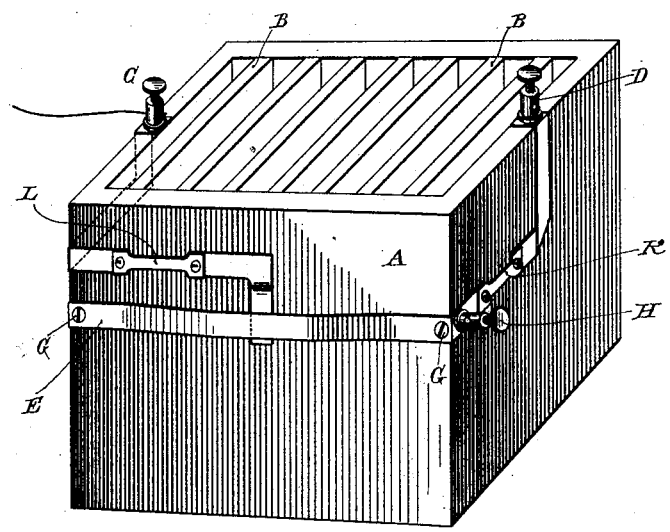

(No Model.)

H. E. DEY.
CUT-OUT FOR SECONDARY BATTERIES.

No. 418,701. Patented Jan. 7, 1890.

Witnesses:
Raphael Netter
Robt. F. Gaylord

Inventor
Harry E. Dey
By Duncan, Curtis & Page

UNITED STATES PATENT OFFICE.

HARRY E. DEY, OF NEW YORK, N. Y., ASSIGNOR TO PHOEBUS H. ALEXANDER, OF HYDE PARK, MASSACHUSETTS.

CUT-OUT FOR SECONDARY BATTERIES.

SPECIFICATION forming part of Letters Patent No. 418,701, dated January 7, 1890.

Application filed July 29, 1889. Serial No. 319,091. (No model.)

*To all whom it may concern:*

Be it known that I, HARRY E. DEY, a citizen of the United States, residing at New York, in the county and State of New York, have invented certain new and useful Improvements in Cut-Outs for Secondary Batteries, of which the following is a specification.

This invention is an improvement in cut-outs for secondary batteries—that is to say, apparatus operated or brought into operation under certain predetermined conditions for diverting a charging-current from the battery. This may be done, as is well understood, either by the interruption of the charging-circuit or by shunting the current around the battery.

The device which forms the subject of my present application is one which may be applied to this purpose, and while I have illustrated the principle of its construction and operation under one form only I would state that I do not limit my invention to the particular form which I have shown nor to the special manner of its application.

The object of my invention is to take advantage of the increase or rise of temperature which occurs in a secondary battery when charged too rapidly or heavily to operate a thermostatic device by means of which the charging-current may be interrupted or diverted. This may be accomplished in a great variety of ways. I prefer, however, as the simplest and most effective way of carrying out the invention, to employ a box or cell for the battery, composed of a substance having a comparatively high coefficient of expansion, and to utilize this expansion for imparting movement to one or more contacts arranged to constitute a cut-out or shunting device. This is readily accomplished by securing to the side of the cell a metal strip slightly bowed out from the side and fastened at its ends by screws or clamps. Under the center or bowed portion of this strip is a contact strip or plate, and the two strips, normally insulated from one another, are connected, respectively, to the opposite poles of the battery. By such an arrangement it is obvious that the expansion of the side or wall of the cell will draw down the bowed strip in contact with the other strip or plate and thus short-circuit the battery. Fusible safety-strips may be used to interrupt the battery and dynamo circuit when this occurs, or other well-understood provisions made for arresting the operation of the battery and dynamo. It is of course necessary either that the said bowed strip have a smaller coefficient of expansion than the material of the cell or else be in such position that it is not affected to the same degree by the heat of the battery-fluid.

This device I have illustrated in the accompanying drawings.

Figure 2:
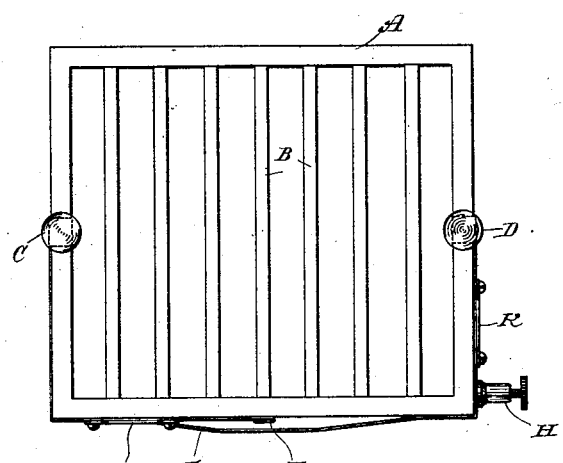

Figure 1 is a perspective view of a battery provided with my improved cut-out. Fig. 2 is a top plan view of the same.

A is the containing cell or box for any ordinary form of secondary battery.

B B are the battery-plates which are immersed in a suitable fluid or solution, and C D are the battery terminals or poles.

The material of the cell or case A should be of hard rubber or other similar material having a relatively high coefficient of expansion.

To one side or outer wall of the cell or box A, I secure a metal strip E, bent or bowed slightly, so that under ordinary circumstances its center is raised from contact with the side of the cell sufficiently to permit the insertion under it of a contact-terminal F. The strip E is conveniently secured to the cell by screws G, passing through holes near the opposite edges of the side of the cell, so as to take advantage of as much of the expansible wall of the cell as possible. The strip E is electrically connected to one of the battery-terminals, as D, and the contact plate or strip F is similarly connected to the other terminal C.

Between the battery-terminal D and the binding-post H, by means of which the charging-current is conducted to the cell, is inserted a fusible safety-strip K. A similar strip L is inserted between the binding-post H and the opposite battery-terminal C—as, for instance, at a convenient point in the strip F.

Whenever in the use of or process of charging or forming this battery the fluid therein becomes heated—a condition well known to be extremely detrimental to the battery—the increasing temperature expands the side wall of the cell, so that the strip E is drawn down into contact with the plate or strip F. The first effect of this action will be to short-circuit the battery, and to fuse the strip K, which is to be made smaller or more easily fused than the strip L. The battery is thus cut out and the charging-circuit then interrupted by the fusing of the strip L.

Each cell of a series of batteries may be provided with one of these cut-outs, so that any local defect or improper action may be at once detected. It is obvious that the object of the invention is or may be accomplished the instant that the two contact-strips are brought together by the expansion produced by the heating of the battery-fluid. For this movement, once obtained, may be utilized in a great variety of ways, either to cut out the battery or to indicate in any well-known way the existence of an abnormal condition therein.

What I claim as my invention is—

1. A thermostatic cut-out, combined and associated with a secondary battery in substantially the manner set forth, and adapted to be operated by the heat of the battery-fluid when the temperature of the same rises to a given point, as set forth.

2. The combination, with a secondary battery, of a cut-out attached to a part of the battery capable of expansion as the result of a rise of temperature of the battery-fluid and adapted to be operated by such expansion as herein set forth.

3. The combination, with a secondary battery, of a band or strip having a different coefficient of expansion under varying temperatures from the material composing the jar or cell and secured to said cell so as to be moved by an expansion of the same by the heating of the battery-fluid, and a contact-plate arranged to be encountered by the said band or strip, these parts being constructed as a circuit-closer or cut-out to divert the charging-current from the battery when the fluid therein becomes heated.

4. The combination, with the expansible cell or case of a secondary battery, of a bent or bowed metal strip E, secured to the side of the cell at two points, the contact-strip F, extending under the same, and an electrical connection between the poles of the battery and the said strips, whereby the contact of the two strips will shunt the battery, as herein set forth.

In testimony whereof I have hereunto subscribed my name this 26th day of July, A. D. 1889.

HARRY E. DEY.

Witnesses:
PARKER W. PAGE,
CAROLINE E. DAVIDSON.